United States Patent
Beaudet

(10) Patent No.: US 10,706,257 B2
(45) Date of Patent: Jul. 7, 2020

(54) METHOD FOR DETECTING A FAKE FINGERPRINT

(71) Applicant: IDEMIA IDENTITY & SECURITY FRANCE, Issy les Moulineaux (FR)

(72) Inventor: Jean Beaudet, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 167 days.

(21) Appl. No.: 16/002,803

(22) Filed: Jun. 7, 2018

(65) Prior Publication Data

US 2018/0357461 A1   Dec. 13, 2018

(30) Foreign Application Priority Data

Jun. 7, 2017 (FR) ..................... 17 55074

(51) Int. Cl.
| | |
|---|---|
| G06K 9/00 | (2006.01) |
| G06K 9/20 | (2006.01) |
| G06K 9/62 | (2006.01) |
| G06T 7/40 | (2017.01) |

(52) U.S. Cl.
CPC ....... G06K 9/0012 (2013.01); G06K 9/00087 (2013.01); G06K 9/00107 (2013.01); G06K 9/2018 (2013.01); G06K 9/2036 (2013.01); G06K 9/6202 (2013.01); G06T 7/40 (2013.01)

(58) Field of Classification Search
None
See application file for complete search history.

(56) References Cited

U.S. PATENT DOCUMENTS

| | | | | |
|---|---|---|---|---|
| 7,831,072 | B2 * | 11/2010 | Rowe ................. | G06K 9/00046 340/5.53 |
| 8,498,458 | B2 | 7/2013 | Schuckers et al. | |
| 9,141,847 | B2 * | 9/2015 | Shin ................... | G06K 9/00114 |

(Continued)

FOREIGN PATENT DOCUMENTS

| | | |
|---|---|---|
| FR | 3 030 834 A1 | 6/2016 |
| FR | 3 040 225 A1 | 2/2017 |
| WO | 2015/091701 A1 | 6/2015 |

OTHER PUBLICATIONS

Feb. 15, 2018 Search Report issued in French Patent Application No. 1755074.

Primary Examiner — Vikkram Bali
(74) Attorney, Agent, or Firm — Oliff PLC

(57) ABSTRACT

Method for detecting attempted fraud by using an artificial material during a biometric acquisition, including: illuminating, with lighting, a surface of an object having a texture, acquiring a first image of the surface; illuminating, with non-uniform lighting, the surface and acquiring a second image of the surface, the non-uniform lighting causing light to diffuse within the illuminated material at an intensity that varies according to a law that is a function of a first position parameter and is invariable along a second position parameter; computing a correction, varying along the first position parameter, that is to be locally applied to the first image to bring the amplitude of the texture on the first image substantially to the level of that on the second image; generating, on the basis of the correction, information relating to the artificial or non-artificial nature of the material.

20 Claims, 2 Drawing Sheets

(56) References Cited

U.S. PATENT DOCUMENTS

| | | |
|---|---|---|
| 2003/0025897 A1 | 2/2003 | Iwai |
| 2007/0211926 A1* | 9/2007 | Shinzaki ............ G06K 9/00107 |
| | | 382/124 |
| 2018/0239944 A1* | 8/2018 | Ohno .................. A61B 5/1172 |

* cited by examiner

METHOD FOR DETECTING A FAKE FINGERPRINT

The present invention relates to the field of biometric authentication.

Fingerprint recognition is performed using optical sensors that acquire an image of the texture of the finger. This acquisition is conventionally performed under uniform illumination, at one or more wavelengths, generally a single wavelength.

A classic fraud involves copying the print of a person onto an artificial material without their knowledge, then using the fake print to deceive the optical sensor.

Various solutions have already been proposed for overcoming this problem.

Application FR 3030834 discloses a method for acquiring and analyzing prints, in which the fluorescence emitted by an object in response to an excitation beam is analyzed with a view to establishing a validity criterion for distinguishing biological tissues from other objects.

Application WO 2015/091701 discloses a method intended to verify that an element is covered with real skin, where an illuminated zone of the element directly illuminated by a light beam and a peripheral zone are detected. An analysis zone covering the illuminated zone and the peripheral zone is divided into a plurality of computation zones, with an average intensity curve being established for each of these zones in order to be compared to a reference curve.

The aim of the invention is to further improve the methods for biometric authentication and the sensors used to this end, particularly in order to provide a simple to implement solution that allows attempted fraud through the use of an artificial material to be detected.

Therefore, the aim of the invention, according to a first one of its aspects, is a method for detecting attempted fraud through the use of an artificial material during a biometric acquisition, particularly of fingerprints, comprising the following steps:

illuminating, with predefined, preferably uniform, lighting under at least one wavelength, a surface of the individual subject to the biometric acquisition, said surface having a texture, and acquiring a first image of said surface at said wavelength;

illuminating, with non-uniform lighting under at least one wavelength, said surface and acquiring at least one second image of said surface under said non-uniform lighting, said non-uniform lighting causing light to diffuse within the illuminated material at an intensity that varies according to a law that is a function of a first position parameter and is invariable along a second position parameter;

computing, for a set of at least n locations each consolidating pixels with the same first position parameter and different values of the second position parameter on the first and the second image, a correction, varying along the first position parameter, that is to be locally applied to the first image to bring the amplitude of the texture on the first image substantially to the level of that on the second image at the same location, or a correction that is to be locally applied to the second image to bring the amplitude of the texture on the second image substantially to the level of that on the first image at the same location;

generating, on the basis of the correction thus computed (for example, on the basis of the n correction values that have been computed), which represents said law, information relating to the artificial or non-artificial nature of the material on which the biometric acquisition is performed.

Said information may be generated on the basis of a direct or indirect comparison to reference data of the values of the correction or of values representing the evolution of the correction.

A slope may be computed on the basis of correction values and compared to a reference slope. A classifier also may be used that is generated, for example, on the basis of the correction values, directly or even indirectly via the computation of slopes. The classifiers may comprise parameters that are defined by learning as a function of the reference data.

The number of locations is preferably greater than or equal to 10, more preferably to 50.

The invention allows information to be particularly simply and effectively obtained that represents the law providing the variation in the amplitude of the diffused light as a function of the distance covered in the relevant tissue.

By the term "uniform lighting", uniform is to be understood without taking into account the possible effects of ambient light that may be corrected by processing the image and the defects near the lighting used, which also may be corrected on the first image. A lack of uniformity may be tolerated on the first image if it does not further undermine the desired level of performance. Uniform lighting may correspond to a residual variation of the received luminous intensity I that is better than 5%, i.e. that at any point on the illuminated surface of interest on which the gain or the attenuation is computed, then $I=I_o+/-5\%$, where $I_o$ is a constant.

The term "substantially bring to the level" is understood to mean that the gain or the attenuation is determined that allows the difference between the signal that acts as a reference and the amplified or attenuated signal to be brought low enough to obtain the desired signal-to-noise ratio. It is thus possible to attempt to minimize a Euclidean norm realizing this difference, as described hereafter.

Preferably, the correction is obtained by computing a normalized scalar product for a set of at least n vectors $S_b$ of the first image, each vector $S_b$ having as components the values of the pixels of the image that are identified on the image by the same value of the first position parameter and occupying different respective positions along the second position parameter, and for n vectors $S_a$ of the second image, each vector $S_a$ having as components the values of the pixels of the image that are identified on the image by the same value of the first position parameter and occupying different respective positions along the second position parameter, according to the formula $\Gamma=S_a \cdot S_b/S_b \cdot S_b$.

Such a correction minimizes the norm $\|S_a - \Gamma S_b\|$, and thus proves to be optimal.

In the case of a correction $\beta$ that is to be locally applied to the second image to bring the amplitude of the texture on the second image substantially to the level of that on the first image at the same location, the difference is minimal for $\beta=S_a \cdot S_b/S_a \cdot S_a$, with this value minimizing $\|\beta S_a - S_b\|$.

The computation of the correction $\Gamma=S_a \cdot S_b/S_b \cdot S_b$ proves to be preferable to the computation of the correction $\beta=S_a \cdot S_b/S_a \cdot S_a$, as the best results are obtained by projecting onto the signal with the best signal-to-noise ratio, i.e. onto the image with uniform lighting. The advantage of normalization relative to the vector corresponding to the uniform lighting $S_b$ is that a less noisy curve is obtained, since irrelevant information basically has been cancelled out of the local pattern of the print. Information may be generated, on the basis of the correction Γ thus determined, in comparison to reference data, that relates to the artificial or non-artificial nature of the material on which the biometric acquisition is performed.

The first position parameter is, for example, the abscissa parameter x in an orthonormal coordinate system (x, y) associated with the first and the second image, with the second parameter being the ordinate. It may also involve the parameter r in a polar coordinate system (r, θ), with θ being the second position parameter.

The non-uniform lighting may comprise one or more light patterns extending along the second position parameter to generate a linear diffusion profile along the first position parameter. The non-uniform lighting thus may comprise a plurality of light strips parallel to each other and perpendicular to an axis defined by the first position parameter.

Alternatively, the non-uniform lighting may comprise one or more patterns with rotational symmetry, particularly in the form of one or more disk(s) or ring(s). The one or more patterns are centered on the polar coordinate system (r, θ), so as to be invariable along θ.

Preferably, the acquisition of the first and second images is synchronous.

In the event that the acquisition of the first and second images is asynchronous, the method according to the invention advantageously comprises spatial adjustment of the first and second images prior to the computation of the aforementioned correction.

In this case, the second image advantageously is reprocessed before spatial adjustment by computing an approximation P(x; r) of the luminous intensity I(x; r) on the image along the first position parameter and by using this approximated intensity, preferably by subtracting this approximated intensity from the second image, in order to obtain a reprocessed image of the texture only, facilitating its comparison with the first image and the spatial adjustment operation.

This approximated intensity is preferably determined by polynomial approximation.

Preferably, a plurality of acquisitions of second images at different wavelengths is completed, particularly in the red, green and blue ranges. A correction as described above may be computed for each of these images. A plurality of diffusion profiles to be compared to reference data is thus obtained, which further enhances the ability to distinguish attempted fraud.

Preferably, the first image is acquired in the red range.

Advantageously, the biometric acquisition is performed by placing the finger or the hand in contact with a surface of a sensor.

The invention is more particularly suitable for biometric acquisition performed on the finger.

A further object of the invention, according to another one of its aspects, is a sensor for implementing the method according to the invention as described above, comprising:
  an imaging device;
  at least one light source for illuminating, with predefined, preferably uniform, lighting under at least one wavelength, a surface of the individual subject to the biometric acquisition and acquiring, with the imaging device, a first image of said surface at said wavelength;
  at least one light source for illuminating, with non-uniform lighting under at least one wavelength, said surface and acquiring, with the imaging device, at least one second image of said surface under said non-uniform lighting, said non-uniform lighting causing light to diffuse within the illuminated material at an intensity that varies according to a law that is a function of a first position parameter and is invariable along a second position parameter;
  a computer for:
  computing, for a set of at least n locations each consolidating pixels with the same first position parameter and different values of the second position parameter on the first and the second image, a correction, varying along the first position parameter, that is to be locally applied to the first image to bring the amplitude of the texture of the first image substantially to the level of that on the second image at the same location, or a correction that is to be locally applied to the second image to bring the amplitude of the texture of the second image substantially to the level of that on the first image at the same location;
  generating, on the basis of the correction thus computed, which represents said law, particularly in direct or indirect comparison to reference data, information relating to the artificial or non-artificial nature of the material on which the biometric acquisition is performed.

Preferably, the computer is configured to:
  compute a normalized scalar product Γ representing said law for a set of at least n vectors $S_b$ of the first image, each vector $S_b$ having as components the values of the pixels of the image that are identified on the image by the same value of the first position parameter and occupying different respective positions along the second position parameter, and for n vectors $S_a$ of the second image, each vector $S_a$ having as components the values of the pixels of the image that are identified on the image by the same value of the first position parameter and occupying different respective positions along the second position parameter, according to the formula: $\Gamma = S_a \cdot S_b / S_b \cdot S_b$, preferably with n>10, more preferably with n>20, even more preferably with n>50;
  generate, on the basis of the scalar product Γ thus determined, particularly in comparison to reference data, information relating to the artificial or non-artificial nature of the material on which the biometric acquisition is performed.

A further aim of the invention, according to another one of its aspects, is a computer program product, for implementing the method according to the invention, present on a computer medium or being downloadable, comprising a set of instructions, which, when executed by at least one processor, initiate:
  illumination, with predefined, preferably uniform, lighting under at least one wavelength, of a surface of the individual subject to the biometric acquisition, said surface having a texture, and acquisition of a first image of said surface at said wavelength;
  illumination, with non-uniform lighting under at least one wavelength, of said surface and acquisition of at least one second image of said surface under said non-uniform lighting, said non-uniform lighting causing light to diffuse within the illuminated material at an intensity that varies according to a law that is a function of a first position parameter and is invariable along a second position parameter;
  computation, for a set of at least n locations each consolidating pixels with the same first position parameter and different values of the second position parameter on the first and the second image, a correction, varying along the first position parameter, that is to be locally applied to the first image to bring the amplitude of the texture of the first image substantially to the level of that on the second image at the same location, or a correction that is to be locally applied to the second image to bring the amplitude of the texture of the second image substantially to the level of that on the first image at the same location;

generation, on the basis of the correction thus computed, which represents said law, particularly in direct or indirect comparison to reference data, of information relating to the artificial or non-artificial nature of the material on which the biometric acquisition is performed.

The invention will be better understood upon reading the following detailed description of non-limiting embodiments thereof, and with reference to the accompanying drawings, in which.

Figure 1:
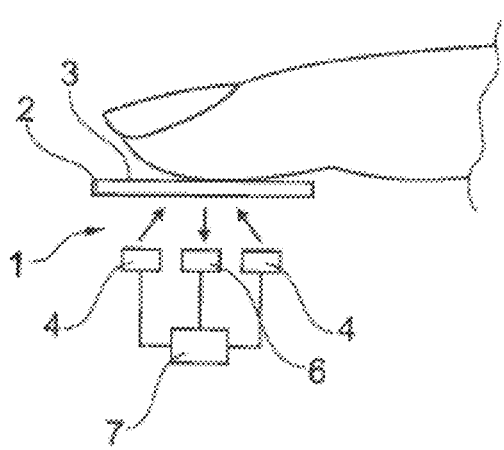
FIG. 1 is a schematic and partial representation of a sensor according to the invention.

The invention may be applied to a fingerprint sensor 1 as schematically shown in FIG. 1. Such a sensor comprises, for example, in a manner per se known, a transparent window 2, defining a surface 3, on which the finger may be placed during the biometric acquisition, as well as one or more light sources 4 illuminating the surface of the finger placed on the window 2 during the biometric acquisition, which may be performed using an imaging device 6, which allows images to be acquired of the surface of the finger placed on the window 2. The sources 4, as well as the imager 6, are connected to a processing circuit 7, which comprises, for example, one or more microprocessors and one or more electronic memories allowing software to be executed for operating the sensor 1.

The electronic circuit 7 may be integrated into the same unit as the light sources 4 and the imaging device 6.

The sources 4 are, for example, produced with one or more LEDs as well as, where necessary, one or more suitable optical devices that allow the desired lighting to be obtained.

Thus, the sources 4 may be configured to allow uniform lighting of the surface of the finger under at least one wavelength in order to acquire a first image thereof. The sources 4 also may be arranged to illuminate the finger with a particular light pattern in order to be able to process the observed image, as explained hereafter, to compute a diffusion profile of the light in the finger.

Examples of fingerprint sensors 1 to which the invention may be applied are disclosed in applications FR 3025042 and FR 3030834. When the uniform lighting results from turning on a plurality of light sources only one part may be turned on, for example, to obtain non-uniform lighting.

Acquisition under uniform lighting is performed, for example, at a wavelength in the red range. A plurality of images may be acquired with a non-uniform light pattern, under different wavelengths, for example in the red, green and blue ranges.

The imaging device 6 may be monochrome. The imaging device 6 may comprise a matrix of pixels in order to acquire an image without having to scan the finger on the window of the sensor. It may be of the TFT (Thin Film Transistor) or other type.

Acquisition of an image under uniform lighting, as well as the one or more images with a light pattern providing non-uniform lighting, may be synchronous or asynchronous.

An asynchronous acquisition particularly may prove to be suitable for a sensor comprising a monochrome imaging device.

Figure 2:
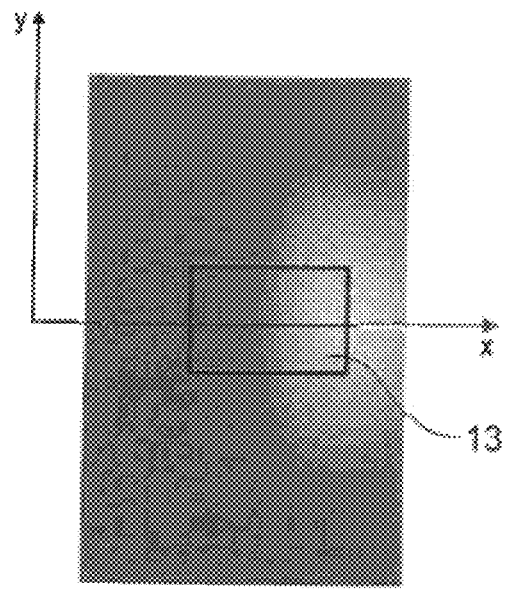
FIG. 2 shows the image of a test chart illuminated by a non-uniform light.

In one embodiment of the invention, the light pattern that is sent onto the surface of the finger in order to illuminate the finger in a non-uniform manner exhibits invariance along a direction y, as shown in FIG. 2, at least over a certain distance either side of the x axis of the associated reference (x, y).

Such lighting allows a diffusion of light to be observed within the skin and progressive extinction of the luminous intensity re-emitted by the finger when progressively moving away from the illuminated surface along the x axis.

The way that this intensity decreases is a characteristic of the environment in which the light diffuses and may allow a real finger to be distinguished from a fake finger.

FIG. 2 shows, by means of a rectangle, the zone in which the measurement is performed, centered on the x axis, in order to avoid the edge effects where illumination may not be as invariant as desired along y. The rectangle covers at least 5 by 5 mm, for example.

Figure 3:
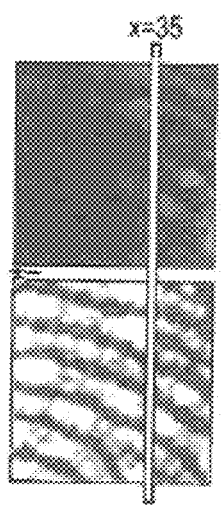
FIG. 3 shows two portions of images of a fingerprint subject to non-uniform and uniform lighting, respectively, with a line x=35 showing the location of the pixels of coordinates (35, y) on each image.

FIG. 3 shows the same zone of the surface of the finger subject to the biometric acquisition, respectively under non-uniform lighting as it results from the light pattern shown in FIG. 2 (upper image in FIG. 3) and under uniform lighting (lower image in FIG. 3).

Light diffuses from right to left on the image in the finger that is illuminated in a non-uniform manner. A line in FIG. 3 shows the pixels located on the abscissa x=35 on the image.

It is assumed that the texture of the two images coincides, i.e. that the finger has not moved between the time when the acquisition under uniform lighting was performed and the time when the one or more acquisitions under non-uniform lighting were performed.

If, particularly in the event of asynchronous acquisitions, a movement of the finger is suspected between the acquisition under uniform lighting and the acquisition under non-uniform lighting, spatial adjustment may be performed, as described hereafter.

Figure 4:
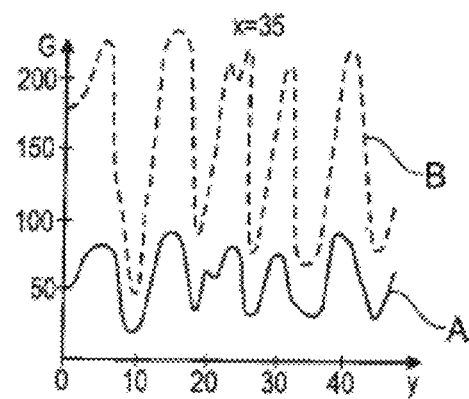
FIG. 4 shows the variation of the luminous intensity returned by the print as a function of the second position parameter for the value x=35 of the first position parameter on the images of FIG. 3.

FIG. 4 shows the grey scale G of the pixels along this line x=35, respectively for the image under uniform lighting (curve B) and for the image under non-uniform lighting (curve A). Undulations may be seen that respectively correspond to the ridges and valleys of the surface of the skin.

According to one embodiment of the invention, the correction that is to be applied to the signal corresponding to the curve B is sought so as to make it substantially correspond to the signal corresponding to the curve A, which may allow the texture of the image illuminated in a uniform manner to be used as a reference and thus improve the signal-to-noise ratio for the measurement of the decreasing profile of the light within the skin.

It is thus possible to seek to minimize the expression $\|S_a(x)-\Gamma S_b(x)\|$ (1) for each vector $S_a(x)$ and $S_b(x)$. Each vector $S_a(x)$ and $S_b(x)$ has as components the grey values of the pixels when y varies, with x being constant, which respectively corresponds to a concatenation of the values of the curves A for $S_a$ and B for $S_b$.

Expression (1) is minimal for $\Gamma(x)=S_a(x)\cdot S_b(x)/\|S_b(x)\|^2$.

Figure 5:
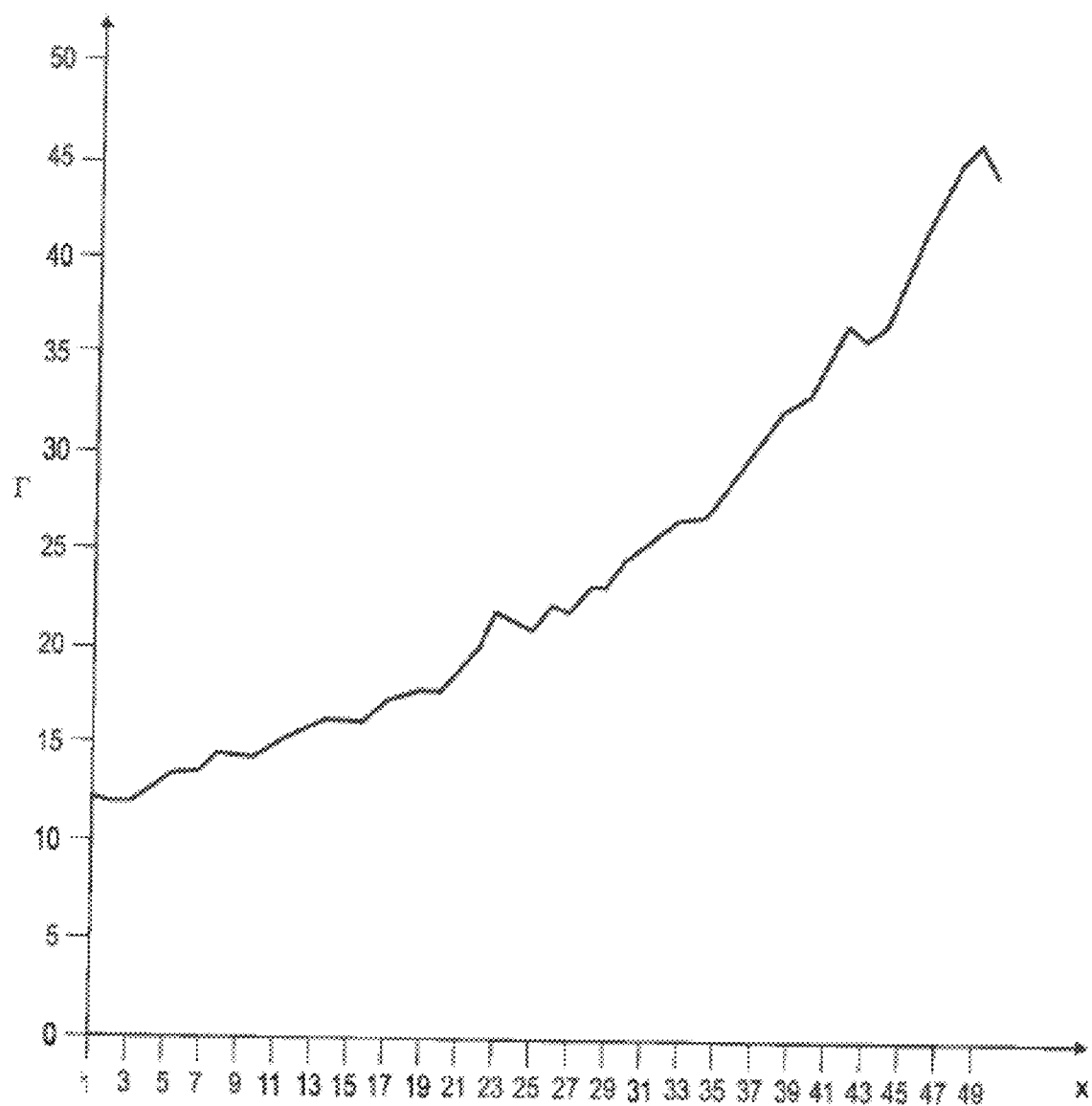
FIG. 5 shows an example of a variation of the normalized scalar product Γ as a function of the first position parameter x.

The function $\Gamma(x)$ is thus obtained, which provides the correction that is to be locally applied to the image under uniform lighting, such as that provided in FIG. 5, which represents, by a close factor, the decreasing law of the luminous intensity in the skin as a function of the distance to the light pattern when the finger is illuminated in a non-uniform manner.

The curve that is obtained may be compared to reference data generated on the basis of observations on a large number of samples and a means is thus obtained that allows a real finger to be distinguished from a fake finger, with the materials used for the fake fingers such as paper or some plastic materials, for example, having different light diffusion properties than those of skin.

By multiplying the acquisitions under different wavelengths by non-uniform lighting of the finger, curves $\Gamma(x)$ may be obtained for different wavelengths and thus a real finger may be more precisely distinguished from a fake finger.

Of course, various mathematical processes may be applied to the function $\Gamma(x)$ with a view to generating values that may be compared to reference data. The sum of the differences between the observed function $\Gamma(x)$ and a reference function $\Gamma_{ref}(x)$ particularly may be computed by the formula $\int|\Gamma(x)-\Gamma_{ref}(x)|dx$. (2), and this result may be compared to a reference value.

The average slope also may be computed at one or more locations on the curve $\Gamma(x)$ and compared to reference values. One or more classifiers also may be used, as mentioned above.

Preferably, the number of acquisition points n along x is high, in order to benefit from precision that is advantageous when comparing $\Gamma(x)$ to the reference data.

Preferably, the number of points for which the vectors $S_a$ and $S_b$ are sampled along x is greater than or equal to 10, preferably to 20, and even to 30 or 50.

In the example just described with reference to FIGS. 2 to 5, the non-uniform lighting is obtained using a single pattern that represents an invariance along the y axis.

The single light pattern shown in FIG. 2 extends, for example, along the y axis over a distance that is greater than or equal to 5 mm.

Figure 6:
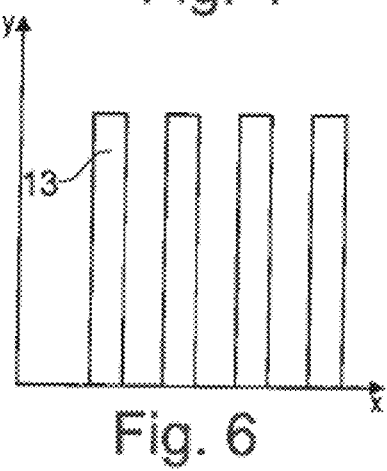
FIG. 6 shows another example of an illumination pattern generating a linear diffusion profile of the light.

The surface may be illuminated with a plurality of patterns that are invariant along y and that are remote from each other along the x axis, as shown in FIG. 6.

This figure shows illumination in the form of fringes 13 parallel to each other and to the y axis, and evenly distributed along the x axis. In such a case, a profile $\Gamma(x)$ is obtained that is periodic, which allows the signal-to-noise ratio to be further enhanced by agglomerating the profiles locally obtained for each fringe.

In the case of the fringes of FIG. 6, each fringe extends, for example, along the y axis over a distance that is greater than or equal to 5 mm and is 1 mm wide.

The invention is not limited to non-uniform lighting that is invariant along y, with the diffusion and re-emission profile being observed along x.

Thus, the non-uniform lighting may be produced with a pattern that is invariant along the azimuth θ around a center of symmetry.

Figure 7:
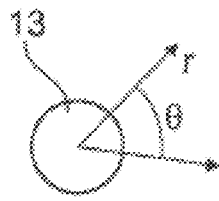
FIGS. 7 and 8 show two other examples of illumination patterns generating a radial diffusion profile of the light.

FIG. 7 shows such a pattern 13 producing non-uniform lighting.

In the example in this figure, the pattern 13 is a light disk centered on a polar coordinate system. Invariant lighting along the azimuthal position parameter θ and a decrease in the luminous intensity diffused and re-emitted along the radial position parameter r is thus obtained.

Figure 8:
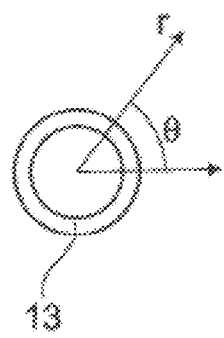

An invariant light pattern also may be obtained along the azimuth parameter θ by illuminating the surface of the finger with a light ring as shown in FIG. 8.

Lighting combinations also may be produced that are invariant along the azimuth θ with, for example, a central illuminated discoid zone and, at a certain distance from this central zone, one or more light rings.

In the event that the invariance is along the azimuth, the scalar product $\Gamma(r)=S_a(r)\cdot S_b(r)/\|S_b(r)\|^2$ may be computed in a manner similar to that previously described, with each vector $S_a$ (non-uniform lighting) or $S_b$ (uniform lighting) having as components the values of the pixels located on the image at the same value r when the azimuth θ varies.

In the event of asynchronous acquisition, spatial adjustment of the images may be completed, prior to the computation of the correction $\Gamma(x)$ or $\Gamma(r)$. The same skin relief will then have the same coordinates on the uniformly illuminated image and on the non-uniformly illuminated image.

To assist the spatial adjustment, the illuminated image may be processed in a non-uniform manner so as to best eliminate the influence of the reduction in lighting therefrom.

Figure 9:
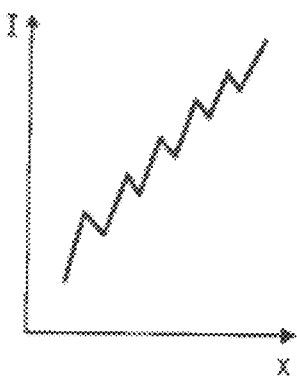
FIG. 9 shows an example of a linear diffusion profile of the light where the luminous intensity re-emitted by the finger varies along the first position parameter x.

In the case of the example of a linear profile as shown in FIG. 9, the luminous intensity I(x) of the light returned by the finger generally varies along the x axis in a cumulated manner with a local variation associated with the presence of the texture on the illuminated surface.

The polynomial P(x) may be computed that best approximates the evolution of the intensity I(x). Subsequently, the polynomial P(x) may be subtracted from the image or the image may be divided by the polynomial P(x), which provides an image of the texture that is easier to compare to the image of the texture under uniform lighting. The two images may be compared and one of them may be moved so that it may be best superposed on the other image in order to obtain the desired adjustment.

Throughout the aforementioned description it has been assumed that the image of the finger was not polluted by external light sources such as daylight or artificial lighting. In order to eliminate the influence of these sources on the image, an image may be acquired of the "noise" without lighting originating from the sensor and this acquisition subsequently may be used to eliminate the influence of the external lighting, for example, by subtracting the signal originating from the ambient light pollution, as provided by the image of the "noise", from the image observed with the light sources of the sensor.

Of course, the invention is not limited to the aforementioned embodiments.

The invention is particularly suitable for a sensor with finger contact on the surface 3 of the window. However, the invention is not limited to this type of sensor and is also applicable to a contactless sensor, allowing remote acquisition of images.

The invention is not limited to the acquisition of fingerprints and also may be applied to the acquisition of palm prints and, more generally, to any biometric acquisition in which light is projected onto a surface having a certain texture, capable of diffusing light within itself.

Thus, the invention may apply to the biometric acquisition of the iris, with the texture observed under uniform and non-uniform lighting in this case being that of the white of the eye and/or the iris.

In the previously described examples, the correction Γ(x) to be applied to the signal obtained under uniform lighting has been computed so as to substantially bring it to the level of that obtained under non-uniform lighting. In one variation, the correction β(x) to be applied to the curve A may be computed so as to bring the amplitude of the corresponding signal substantially to that of the signal under uniform lighting, i.e. the curve B.

The term "bring substantially to the level" is understood to mean that the norm $\|S_a - \Gamma S_b\|$ or $\|\beta S_a - S_b\|$, accordingly, is minimal.

It is possible to provide, in the computation attempting to find the most suitable correction, more weight to some pixels of the image than to others. For example, more weight may be given to high intensity pixels, which have a more favorable quantification signal-to-noise ratio.

Finally, even though an acquisition under uniform lighting is preferable insofar as it provides a better quality image for recognizing minutiae, any predefined lighting, the illumination characteristics of which in the plane of the surface of the sensor are known and slightly vary spatially (i.e. local lighting that is almost uniform at the scale of the pattern of the print), may be appropriate for computing a value representing the light diffusion and re-emission law as previously explained. A law Γ(x) is obtained that may be processed, knowing the distribution law, to find the diffusion law.

The invention claimed is:

1. A method for detecting attempted fraud by using an artificial material during a biometric acquisition, comprising:
    illuminating, with predefined, lighting under at least one wavelength, a surface of an individual subject to the biometric acquisition, said surface having a texture;
    acquiring a first image of said surface at said at least one wavelength;
    illuminating, with non-uniform lighting under at least one wavelength, said surface;
    acquiring at least one second image of said surface under said non-uniform lighting, said non-uniform lighting causing light to diffuse within an illuminated material at an intensity that varies according to a law that is a function of a first position parameter (x; r) and is invariable along a second position parameter (y; θ);
    computing, for a set of at least n locations each consolidating pixels with a same first position parameter (x; r) and different values for the second position parameter (y; θ) on the first image and the at least one second image,
        a correction, varying along the first position parameter, that is to be locally applied to the first image to bring an amplitude of the texture on the first image substantially to a level of that on the second image at the same location, or
        a correction that is to be locally applied to the at least one second image to bring an amplitude of a texture on the at least one second image substantially to the level of that on the first image at the same location; and
    based on the correction thus computed, which represents said law, generating information relating to an artificial or non-artificial nature of the material on which the biometric acquisition is performed.

2. The method according to claim 1, wherein:
    the correction that is to be locally applied to the first image is obtained by computing a normalized scalar product Γ(x; r)
        for a set of at least n vectors $S_b(x; r)$ of the first image, each vector $S_b(x; r)$ having as components values of pixels that are identified on an image by a same value of the first position parameter (x; r) and occupying different respective positions along the second position parameter (y; θ), and
        for n vectors $S_a(x; r)$ of the at least one second image, each vector $S_a(x; r)$ having as components values of pixels that are identified on an image by a same value of the first position parameter (x; r) and occupying different respective positions along the second position parameter (y; θ),
    according to the formula:

$$\Gamma(x;r) = S_a(x;r) \cdot S_b(x;r) / S_b(x;r) \cdot S_b(x;r), \text{ and}$$

the information relating to the artificial or non-artificial nature of the material on which the biometric acquisition is performed is generated based on the normalized scalar product Γ(x; r) thus computed.

3. The method according to claim 1, wherein:
    the correction that is to be locally applied to the at least one second image is obtained by computing a normalized scalar product β(x; r)
        for a set of at least n vectors $S_b(x; r)$ of the first image, each vector $S_b(x; r)$ having as components values of pixels that are identified on an image by a same value of the first position parameter (x; r) and occupying different respective positions along the second position parameter (y; θ), and
        for n vectors $S_a(x; r)$ of the at least one second image, each vector $S_a(x; r)$ having as components values of pixels that are identified on an image by a same value of the first position parameter (x; r) and occupying different respective positions along the second position parameter (y; θ),
    according to the formula:

$$\beta(x;r) = S_a(x;r) \cdot S_b(x;r) / S_a(x;r) \cdot S_a(x;r), \text{ and}$$

the information relating to the artificial or non-artificial nature of the material on which the biometric acquisition is performed is generated based on the normalized scalar product β(x; r) thus computed.

4. The method according to claim 1, wherein the non-uniform lighting comprises one or more light patterns extending along the second position parameter (y) in order to generate a linear profile for diffusing light along the first position parameter (x).

5. The method according to claim 4, wherein the non-uniform lighting comprises a plurality of light strips parallel to each other and perpendicular to an axis defined by the first position parameter (x).

6. The method according to claim 1, wherein the non-uniform lighting comprises one or more patterns with rotational symmetry.

7. The method according to claim 1, wherein the acquisition of the first image and the acquisition of the at least one second image are synchronous.

8. The method according claim 1, wherein the acquisition of the first image and the acquisition of the at least one second image are asynchronous.

9. The method according to claim 8, comprising performing a spatial adjustment of the first image and the at least one second image prior to the computation of said correction.

10. The method according to claim 8, wherein:
the at least one second image is reprocessed before the spatial adjustment by computing an approximation P(x; r) of a luminous intensity I(x; r) on the image along the first position parameter, and
by using this approximated intensity, a reprocessed image of the texture of the at least one second image is obtained, facilitating its comparison with the first image.

11. The method according to claim 10, wherein the approximation is polynomial.

12. The method according to claim 1, wherein:
the at least one second image is a plurality of second images, and
a plurality of acquisitions of the second images are completed at different wavelengths.

13. The method according to claim 1, wherein the acquisition of the first image is performed in a red range.

14. The method according to claim 1, wherein the biometric acquisition is performed by placing a finger or a hand in contact with a surface of a sensor.

15. The method according to claim 1, wherein the biometric acquisition is performed on a finger.

16. The method according to claim 1, wherein n is greater than or equal to 10.

17. A sensor for implementing the method according to claim 1, comprising:
an imaging device acquiring the first image and the at least one second image;
at least one light source for illuminating the surface with the predefined lighting;
at least one light source for illuminating the surface with the non-uniform lighting; and
a computer configured to:
compute, for the set of at least n locations,
the correction that is to be locally applied to the first image, or
the correction that is to be locally applied to the at least one second image; and
based on the correction thus computed, generate the information relating to the artificial or non-artificial nature of the material on which the biometric acquisition is performed.

18. The sensor according to claim 17, wherein the computer is configured to:
compute the correction that is to be locally applied to the first image by computing a normalized scalar product $\Gamma(x;r)$
for a set of at least n vectors $S_b(x; r)$ of the first image, each vector $S_b(x; r)$ having as components values of pixels that are identified on an image by a same value of the first position parameter (x; r) and occupying different respective positions along the second position parameter (y; $\theta$), and
for n vectors $S_a(x; r)$ of the at least one second image, each vector $S_a(x; r)$ having as components values of pixels that are identified on an image by a same value of the first position parameter (x; r) and occupying different respective positions along the second position parameter (y; $\theta$),
according to the formula:
$$\Gamma(x;r)=S_a(x;r)\cdot S_b(x;r)/S_b(x;r)\cdot S_b(x;r); \text{ and}$$
generate the information relating to the artificial or non-artificial nature of the material on which the biometric acquisition is performed based on the normalized scalar product $\Gamma(x; r)$ thus computed.

19. The sensor according to claim 17, wherein the computer is configured to:
compute the correction that is to be locally applied to the at least one second image by computing a normalized scalar product $\beta(x; r)$
for a set of at least n vectors $S_b(x; r)$ of the first image, each vector $S_b(x; r)$ having as components values of pixels that are identified on an image by a same value of the first position parameter (x; r) and occupying different respective positions along the second position parameter (y; $\theta$), and
for n vectors $S_a(x; r)$ of the at least one second image, each vector $S_a(x; r)$ having as components values of pixels that are identified on an image by a same value of the first position parameter (x; r) and occupying different respective positions along the second position parameter (y; $\theta$),
according to the formula:
$$\beta(x;r)=S_a(x;r)\cdot S_b(x;r)/S_a(x;r)\cdot S_b(x;r);$$
and
generate the information relating to the artificial or non-artificial nature of the material on which the biometric acquisition is performed based on the normalized scalar product $\beta(x; r)$ thus computed.

20. A non-transitory computer readable medium comprising computer instructions, which, when executed by at least one processor, cause the at least one processor to perform the method according to claim 1.

* * * * *